United States Patent
Nara

(10) Patent No.: US 11,435,321 B2
(45) Date of Patent: Sep. 6, 2022

(54) ULTRASONIC INSPECTION DEVICE

(71) Applicant: YAMAHA FINE TECHNOLOGIES CO., LTD., Hamamatsu (JP)

(72) Inventor: Akihiro Nara, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 130 days.

(21) Appl. No.: 16/535,567

(22) Filed: Aug. 8, 2019

(65) Prior Publication Data
US 2020/0049664 A1 Feb. 13, 2020

(30) Foreign Application Priority Data

Aug. 10, 2018 (JP) .............................. JP2018-151643

(51) Int. Cl.
*G01N 29/22* (2006.01)
*G01N 29/27* (2006.01)
(Continued)

(52) U.S. Cl.
CPC ....... *G01N 29/221* (2013.01); *G01N 29/0609* (2013.01); *G01N 29/223* (2013.01);
(Continued)

(58) Field of Classification Search
CPC .... G01N 29/221; G01N 29/223; G01N 29/38; G01N 2291/0289; G01N 2291/048; G01N 29/0609; G01N 29/27
(Continued)

(56) References Cited

U.S. PATENT DOCUMENTS 6,343,510 B1 * 2/2002 Neeson ............. G01N 29/0672
73/602
6,804,873 B2 10/2004 Lehmann
(Continued)

FOREIGN PATENT DOCUMENTS

CN 100412544 C 8/2008
CN 105705904 A 6/2016
(Continued)

OTHER PUBLICATIONS

Office Action issued in Taiwanese Appln. No. 108127495 dated Oct. 16, 2020. English translation provided.
(Continued)

*Primary Examiner* — Lisa M Caputo
*Assistant Examiner* — Rose M Miller
(74) *Attorney, Agent, or Firm* — Rossi, Kimms & McDowell LLP

(57) ABSTRACT

An ultrasonic wave inspection device includes: a transmitter that outputs ultrasonic waves toward an inspection object; a receiver that receives at least first ultrasonic waves passed through the inspection object, among the ultrasonic waves output from the transmitter; a member that regulates a second propagation path, the second propagation path being a portion of propagation paths through which the output ultrasonic waves reach the receiver, and the second propagation path being different from a first propagation path through which the first ultrasonic waves reach the receiver; and a signal controller that extracts ultrasonic waves of a predetermined time segment from at least the first ultrasonic waves, the predetermined time segment starting from a time when the first ultrasonic waves is received.

15 Claims, 10 Drawing Sheets

(51) Int. Cl.
  *G01N 29/06* (2006.01)
  *G01N 29/38* (2006.01)
(52) U.S. Cl.
  CPC .............. *G01N 29/27* (2013.01); *G01N 29/38* (2013.01); *G01N 2291/0289* (2013.01); *G01N 2291/048* (2013.01)
(58) Field of Classification Search
  USPC .......................................... 73/609, 644, 617
  See application file for complete search history.

(56) References Cited

U.S. PATENT DOCUMENTS

| | | | |
|---|---|---|---|
| 6,840,108 | B2 | 1/2005 | Stauffer |
| 6,920,793 | B2 | 7/2005 | Stauffer |
| 9,448,208 | B2 | 9/2016 | Stauffer |
| 9,874,842 | B2 * | 1/2018 | Ishida ................... G01N 29/11 |
| 2006/0077758 | A1 | 4/2006 | Focke |
| 2015/0308982 | A1 | 10/2015 | Perrin |

FOREIGN PATENT DOCUMENTS

| | | |
|---|---|---|
| CN | 105829882 A | 8/2016 |
| EP | 0493457 B1 | 1/1994 |
| JP | S51130250 A | 11/1976 |
| JP | H0625596 U | 4/1994 |
| JP | 2012112851 A | 6/2012 |
| JP | 2013127400 A | 6/2013 |
| KR | 1020160058174 A | 5/2016 |
| TW | 200500275 A | 1/2005 |

OTHER PUBLICATIONS

Office Action issued in Taiwanese Application No. 108127874 dated Feb. 5, 2020. English translation provided.
Office Action issued in Taiwanese Appln. No. 108127495 dated Mar. 31, 2020. English translation provided.
Office Action issued in Korean Appln. No. 10-2019-0092984 dated Aug. 18, 2020. English machine translation provided.
Office Action issued in Korean Appln. No. 10-2019-0094721 dated Aug. 18, 2020. English machine translation provided.
Copending U.S. Appl. No. 16/535,525, filed Aug. 8, 2019 (a copy is not included because the cited application is not yet available to the public and the Examiner has ready access to the cited application).
Office Action issued in U.S. Appl. No. 16/535,525 dated Aug. 2, 2021.
Office Action issued in Korean Appln. No. 10-2021-0054262 dated May 12, 2021. English machine translation provided.
Office Action issued in U.S. Appl. No. 16/535,525 dated Apr. 22, 2021.
Notice of Final Rejection issued in Korean Appln. No. 10-2021-0054262 dated Nov. 26, 2021. English translation provided.
Office Action issued in Chinese Appln. No. 201910710638.7 dated Oct. 29, 2021. English machine translation provided.
Advisory Action issued in U.S. Appl. No. 16/535,525 dated Oct. 15, 2021.
Office Action issued in Korean Appln. No. 10-2021-0054262 dated Jan. 25, 2022. English machine translation provided.
Office Action issued in Japanese Appln. No. 2018-151643 dated Apr. 26, 2022. English machine translation provided.
Office Action issued in Japanese Appln. No. 2018-151643 dated Jul. 5, 2022. English machine translation provided.

* cited by examiner

ULTRASONIC INSPECTION DEVICE

CROSS-REFERENCE TO RELATED APPLICATION

Priority is claimed on Japanese Patent Application No. 2018-151643, filed Aug. 10, 2018, the content of which is incorporated herein by reference.

BACKGROUND OF THE INVENTION

Field of the Invention

The present invention relates to an ultrasonic inspection device that inspects for the presence or absence of peeling at a joined location in a packaging container formed by, for example, joining together sheet members.

Description of Related Art

Conventionally, prepackaged food, drinking water and the like are enclosed in pouch-type packaging containers in a sealed state. The packaging container is formed into a bag shape by joining peripheral portions of sheet members (including a film member) by welding, adhesion or the like. After the contents are accommodated inside the container, the opening is closed. Since there is a risk of the contents contained in such a packaging container leaking out if peeling occurs at a joined location, the joined location is inspected at the manufacturing stage.

For example, an ultrasonic inspection device is used in such an inspection. The ultrasonic inspection device transmits ultrasonic waves to the packaging container (workpiece) to be inspected, receives and analyzes the ultrasonic waves that have passed through the packaging container, and thereby determines whether or not peeling has occurred at the joined location.

When ultrasonic waves are transmitted toward one surface side at a location near the end of the peripheral portion of the packaging container, diffracted waves may be generated as a result of the transmitted ultrasonic waves wrapping around the outer side of the end and reaching the other surface side. Reception of such diffracted waves by the ultrasonic inspection device could contribute to an erroneous determination with regard to whether or not peeling has occurred.

As a countermeasure, a technique for preventing reception of diffracted waves in ultrasonic inspection has been proposed (see, for example, U.S. Pat. No. 6,840,108, hereinafter referred to as Patent Document 1). In Patent Document 1, a shield member is provided for blocking ultrasonic waves by covering the end of the packaging container. Thereby, when ultrasonic waves are transmitted to a location near the end of the packaging container, diffracted waves do not occur.

However, the work of covering the edge of the packaging container with the shield member is troublesome and time consuming. In addition, in the case of a packaging container in which the outer shape of the peripheral portion is complicated, the work of covering the end may be difficult.

SUMMARY OF THE INVENTION

The present invention has been achieved in view of the above circumstances. An exemplary object of the present invention is to provide an ultrasonic inspection device capable of accurately inspecting an end of an inspection object while saving time and effort.

In an aspect of the present invention, an ultrasonic wave inspection device includes: a transmitter that outputs ultrasonic waves toward an inspection object; a receiver that receives at least first ultrasonic waves passed through the inspection object, among the ultrasonic waves output from the transmitter; a member that regulates a second propagation path, the second propagation path being a portion of propagation paths through which the output ultrasonic waves reach the receiver, and the second propagation path being different from a first propagation path through which the first ultrasonic waves reach the receiver; and a signal controller that extracts ultrasonic waves of a predetermined time segment from at least the first ultrasonic waves, the predetermined time segment starting from a time when the first ultrasonic waves is received.

In another aspect of the present invention, an ultrasonic wave inspection device includes: a transmitter that has a first surface and outputs ultrasonic waves toward an inspection object; a receiver that has a second surface facing the first surface and receives the ultrasonic waves output from the transmitter; a member that is arranged between the transmitter and the receiver and faces a partial region of the first surface and a partial region of the second surface; and a guide that guides the inspection object and makes at least an end portion of a peripheral portion of the inspection object overlap with the member when viewed from an arrangement direction in which the transmitter and the receiver are arranged.

DETAILED DESCRIPTION OF THE INVENTION

Hereinafter, embodiments of the present invention will be described with reference to the drawings.

Embodiment

First, an embodiment will be described.

Figure 1:
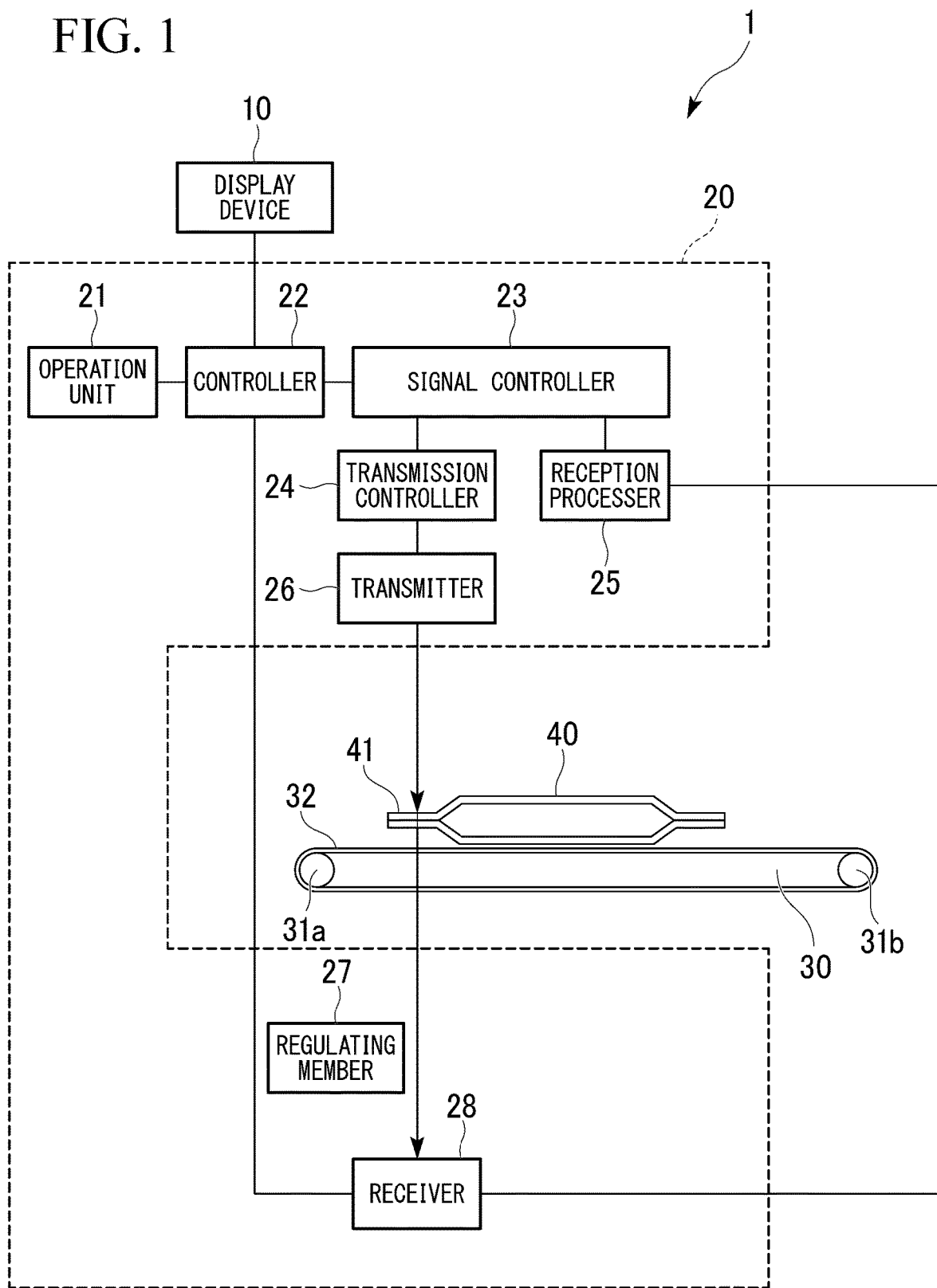
FIG. 1 is a block diagram showing a configuration example of an ultrasonic inspection system 1 to which an ultrasonic inspection device 20 of the embodiment is applied.

FIG. 1 is a block diagram showing a configuration example of an ultrasonic inspection system 1 in the embodiment. The ultrasonic inspection system 1 inspects an inspection object 40 using ultrasonic waves. In the example illustrated in FIG. 1, the ultrasonic inspection system 1 includes a display device 10, an ultrasonic inspection device 20, and a conveying device 30.

The display device 10 displays various types of information related to the ultrasonic inspection. The information is supplied to the display device 10 from a controller 22 of the ultrasonic inspection device 20. The various types of information related to ultrasonic inspection include, for example, information related to the inspection object 40, the wavelength and intensity of the ultrasonic waves to be transmitted, the speed of transporting the inspection object 40, the analysis result for the received ultrasonic waves, and the determination result with regard to the presence or absence of peeling.

The conveying device 30 is, for example, a belt conveyor. In the conveying device 30, the inspection object 40 is placed on a belt 32. In the conveying device 30, the inspection object 40 is conveyed to a predetermined inspection position between the transmitter 26 and the receiver 28 by rotating rollers 31 (roller 31a and roller 31b). The rotation of the rollers 31 is controlled by, for example, a drive control unit (not shown) of the ultrasonic inspection device 20.

The inspection object 40 is an object subject to inspection by the ultrasonic inspection device 20. The inspection object 40 is a packaging container formed by joining peripheral portions of sheet members, for example. The inspection object 40 includes a peripheral portion 41. The peripheral portion 41 is a joining location at which two sheet members constituting the packaging container are joined. The peripheral portion 41 is an example of a location to be inspected of the inspection object 40 in the inspection for the presence or absence of peeling.

The example in FIG. 1 does not limit the conveying direction of the inspection object 40. The conveying direction may be arbitrarily determined according to the location to be inspected of the inspection object 40.

The ultrasonic inspection device 20 is a computer that transmits ultrasonic waves and inspects the inspection object 40 on the basis of the ultrasonic waves that have passed through the inspection object 40. The ultrasonic inspection device 20 includes, for example, an operation unit 21, the controller 22, a signal controller 23, a transmission controller 24, a reception processer 25, the transmitter 26, the regulating member 27, and the receiver 28.

The operation unit 21 includes a keyboard, a mouse, and the like, and is used to input and set various types of information related to ultrasonic inspection. The operation unit 21 outputs, to the controller 22, the various types of information that have been input.

The controller 22 comprehensively controls the ultrasonic inspection device 20. The controller 22 transmits, for example, various types of information input from the operation unit 2, to the display device 10. The controller 22 also transmits, to the display device 10, an analysis result and a result of determining the presence or absence of peeling from the signal controller 23, which are described below.

The signal controller 23 generates a signal for controlling the ultrasonic waves to be transmitted. The ultrasonic waves to be transmitted are, for example, burst signals. The signal controller 23 generates, for example, a burst signal according to the transmission timing and intensity of the ultrasonic waves to be transmitted. The signal controller 23 supplies the generated signal to the transmission controller 24.

Further, the signal controller 23 acquires, via the reception processer 25, the ultrasonic wave signal that has been received by the receiver 28. The signal controller 23 analyzes the intensity and the phase of the acquired ultrasonic wave signal, and outputs the analysis result to the controller 22. Further, the signal controller 23 outputs to the controller 22 the result of determining the presence or absence of peeling (presence or absence of a defect in the peripheral portion) on the basis of the analyzed result. For example, when the intensity of the acquired ultrasonic wave signal is less than a predetermined value, the signal controller 23 determines peeling to have occurred, that is, the peripheral portion is defective. When the intensity of the acquired ultrasonic wave signal is equal to or greater than a predetermined value, the signal controller 23 determines peeling to have not occurred, that is, the peripheral portion is not defective.

When analyzing the intensity and the phase of the acquired ultrasonic wave signal, the signal controller 23 may extract a signal of a predetermined time segment and analyze the intensity and the phase using the extracted signal. If the state of the ultrasonic waves changes in the time domain, by using ultrasonic waves in a certain time segment that is useful for highly accurate analysis, it is possible to improve the accuracy of the determination. For example, the signal controller 23 extracts, from a signal corresponding to the ultrasonic waves received by the receiver 28, a signal of a predetermined time segment, and analyzes the wavelength and intensity of the extracted signal. The predetermined time segment is a time period that starts from a point in time when the receiver 28 has detected the signal, and is, for example, a time segment corresponding to one wavelength of the transmitted ultrasonic waves.

The signal controller 23 may perform signal processing such as phase detection on the acquired ultrasonic wave signal. In a case where ultrasonic waves with mutually different phases are mixed among the acquired ultrasonic waves, by separating ultrasonic waves having different phases from each other, it is possible to improve the determination accuracy.

The transmission controller 24 generates burst waves of a predetermined frequency to be output from an oscillator (not shown) according to a burst signal from the signal controller 23. The transmission controller 24 outputs the generated burst waves to the transmitter 26.

The reception processer 25 acquires the ultrasonic waves received by the receiver 28 and performs processing to facilitate analysis of the acquired ultrasonic waves. For example, the reception processer 25 amplifies the amplitude of the acquired ultrasonic waves using an amplifier. In addition, the reception processer 25 may filter out, from the acquired ultrasonic waves, ultrasonic waves whose wavelength is different from the wavelength of the transmitted ultrasonic waves.

The transmitter 26 transmits the burst waves (ultrasonic waves) generated by the transmission controller 24.

The receiver 28 receives the ultrasonic waves transmitted by the transmitter 26. The receiver 28 supplies the received ultrasonic waves to the reception processer 25.

Here, the positional relationship between the transmitter 26, the receiver 28, and the inspection object 40 will be described.

First, the transmitter 26 and the receiver 28 are arranged spaced apart from each other. The inspection object 40 is disposed between the transmitter 26 and the receiver 28. The ultrasonic waves transmitted by the transmitter 26 reach the inspection object 40, and the ultrasonic waves that have passed through the inspection object 40 (hereinafter referred to as object waves) reach the receiver 28 and the receiver 28 receives the object waves.

When ultrasonic waves are transmitted to the peripheral portion 41 of the inspection object 40, diffracted waves resulting from the ultrasonic waves wrapping around the outer side of the peripheral portion 41 may be generated. Such diffracted waves are considered to reach the receiver 28 directly without passing through the inspection object 40. In this case, ultrasonic waves that have not passed through the inspection object 40 (hereinafter referred to as non-object waves) are received by the receiver 28. In this case, inspection is performed using the ultrasonic waves including the non-object waves, which may be a cause of a reduction in inspection accuracy.

The regulating member 27 regulates the propagation path of the non-object waves so that such non-object waves cannot be easily received by the receiver 28. In some cases, the regulating member 27 regulates the propagation path of the non-object waves so that, even if the non-object waves are received together with the object waves, the non-object waves can be separated by signal processing or the like in the subsequent stage. That is, among the propagation paths of ultrasonic waves from the transmitter 26 to the receiver 28, the regulating member 27 regulates the propagation path of non-object waves. Here, the propagation path of non-object waves is different from the propagation path of object waves that passes through the inspection object 40 and reaches the receiver 28. The propagation path of the object waves is an example of a "first propagation path", while the propagation path of the non-object waves is an example of a "second propagation path".

Specifically, the regulating member 27 elongates the propagation path of the non-object waves that reaches the receiver 28. By elongating the path of non-object waves that reaches the receiver 28, the regulating member 27 delays the time when the non-object waves reach the receiver 28 to be later than the time when the object waves reach the receiver 28. Hereinafter, the positional relationship between the transmitter 26, the receiver 28, and the inspection object 40 in the regulating member 27 will be described with reference to FIGS. 2 and 3. By employing this positional relationship, it becomes possible for the regulating member 27 to regulate the non-object waves.

Figure 2:
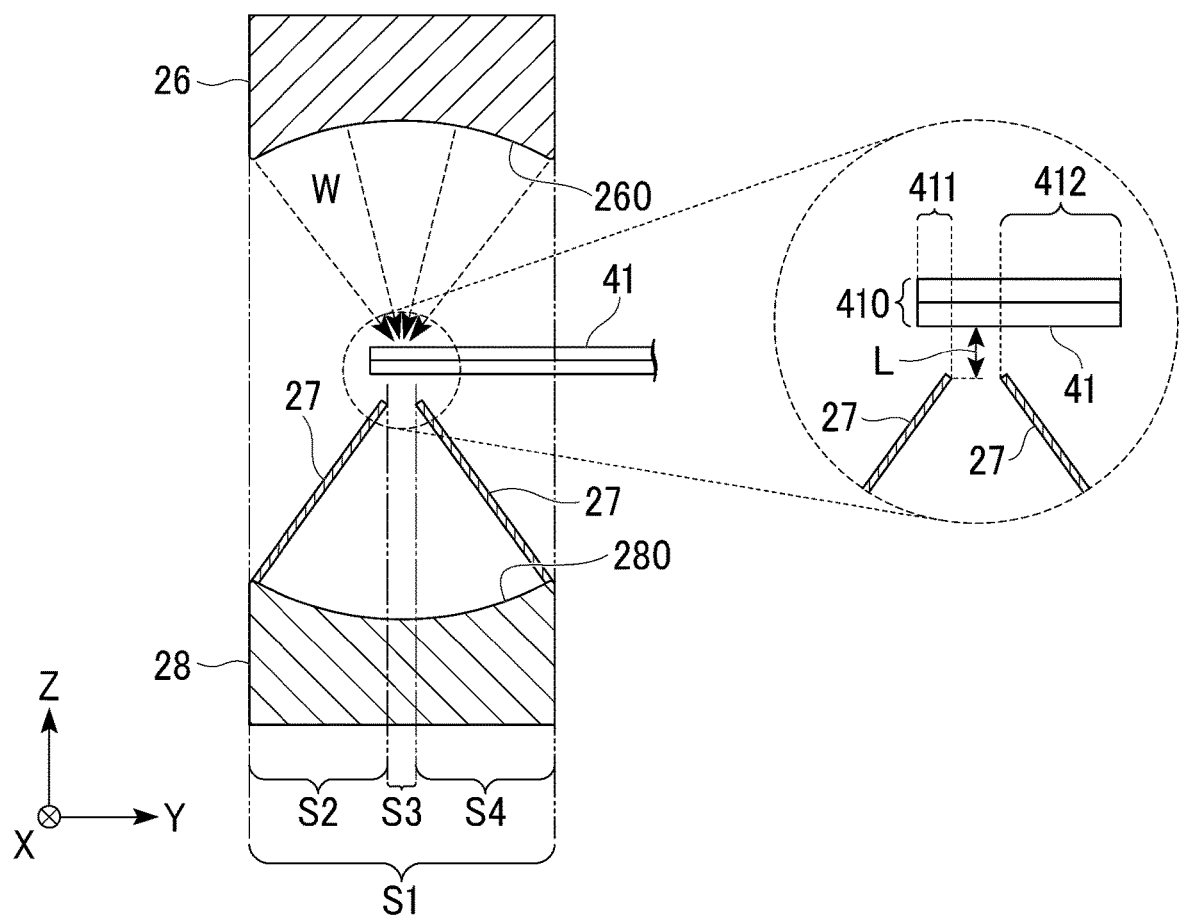
FIG. 2 is a cross-sectional view showing a transmitter 26, a regulating member 27, and a receiver 28 in the embodiment.
Figure 3:
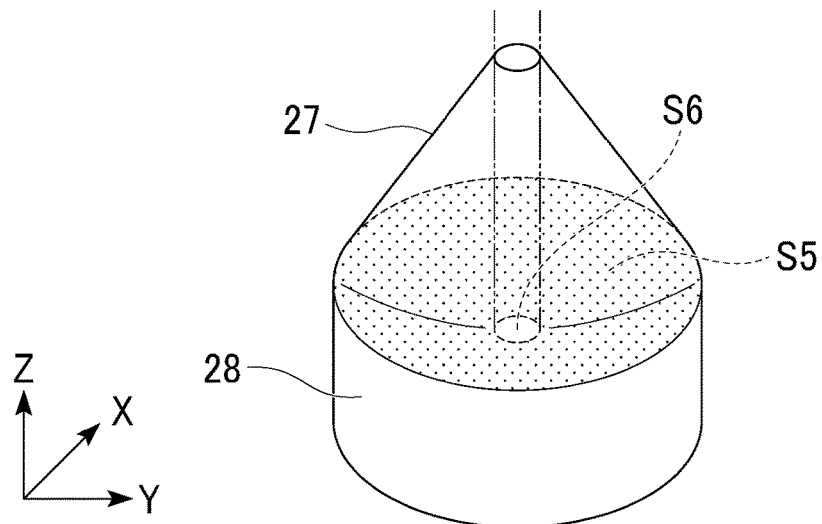
FIG. 3 is a perspective view showing the receiver 28 and the regulating member 27 of FIG. 2.

FIG. 2 is a cross-sectional view showing the transmitter 26 and the receiver 28 included in the ultrasonic inspection device 20 of the embodiment. FIG. 3 is a perspective view of FIG. 2.

As shown in FIG. 2, the transmitter 26 and the receiver 28 are spaced apart in one direction (Z-axis direction). The transmitter 26 and the receiver 28 are fixed to a base (not shown) of the ultrasonic inspection device 20. Thereby, the interval between the transmitter 26 and the receiver 28 is maintained. The transmitter 26 transmits ultrasonic waves toward the receiver 28 from a transmitting surface 260 of the transmitter 26 facing the receiver 28. The receiver 28 receives the ultrasonic waves transmitted from the transmitter 26 at a receiving surface 280 of the receiver 28. The receiving surface 280 faces the transmitter 26.

In FIG. 2, the conveying direction of the inspection object 40 by the conveying device 30 is the X-axis direction. The conveying direction is a direction orthogonal to the arrangement direction (Z-axis direction) of the transmitter 26 and the receiver 28.

Further, an end portion 410 of the inspection object 40 corresponds to the edge of the inspection object 40. The edge of the inspection object 40 extends linearly when viewed from the arrangement direction in which the transmitter 26 and the receiver 28 are arranged.

As shown in FIG. 3, the receiver 28 of the present embodiment is formed in a circular shape when viewed from the arrangement direction of the transmitter 26 and the receiver 28. As shown in FIG. 2, the transmitter 26 of the present embodiment may be formed in the same circular shape as the receiver 28. The transmitting surface 260 of the transmitter 26 forms a recess from the circular periphery toward the central portion, whereby the ultrasonic waves transmitted from the transmitter 26 are converged (focused) in a predetermined range (see ultrasonic waves W in FIG. 2). The shapes of the transmitting part 26 and the receiving part 28 are not limited to a circular shape, and may be formed in arbitrary shapes.

As shown in FIG. 2, the regulating member 27 is disposed between the transmitter 26 and the receiver 28. The regulating member 27 faces the receiving surface 280, and covers a part of the receiving surface 280 when seen in the arrangement direction of the transmitter 26 and the receiver 28. That is, in the state in which the regulating member 27 is disposed between the transmitter 26 and the receiver 28, the regulating member 27 is arranged between the transmitter 26 and partial regions (regions S2 and S4) of a region S1 of the receiving surface 280. By contrast, in this state, the regulating member 27 is not arranged between the transmitter 26 and a remaining region (region S3) of the receiving surface 280.

The regulating member 27 is required to be disposed so as to overlap with a site including at least the end portion 410 of the inspection object 40 at the peripheral portion 41 of the inspection object 40, when viewed from the arrangement direction of the transmitter 26 and the receiver 28. This site is a site 411 which is a part of the peripheral portion 41 shown in the enlarged view of FIG. 2. Here, the site 411 is an example of the "first site".

The range in which the site 411 of the peripheral portion 41 and the regulating member 27 are overlapped with each other is a range extending from the end portion 410 of the inspection object 40 to the end of the regulating member 27 in a direction (Y-axis direction). The Y-axis direction is orthogonal to the conveying direction (X-axis direction) of the inspection object 40 and the arrangement direction (Z-axis direction) of the transmitter 26 and the receiver 28.

The range in which the site 411 and the regulating member 27 are overlapped with each other may be arbitrary. In the present embodiment, the range is a range according to the wavelength of the ultrasonic waves transmitted by the transmitter 26. The range may be, for example, a range extending to the inside (Y-axis positive direction) of the inspection object 40 by a length corresponding to one wavelength of the ultrasonic waves from the end portion 410.

The regulating member 27 is spaced apart from the inspection object 40 by a predetermined distance L in the arrangement direction of the transmitter 26 and the receiver

28. The distance L may be arbitrary. In the present embodiment, the distance L is a length determined by the wavelength of the ultrasonic waves transmitted by the transmitter 26. The distance may be, for example, a length corresponding to one wavelength of the ultrasonic waves. The shorter the distance L, the greater the effect of the regulating member 27 to regulate non-object waves.

The regulating member 27 may be disposed, for example, so as to overlap only the site 411 in the peripheral portion 41 of the inspection object 40. That is, for example, the regulating member 27 may not overlap a site of the peripheral portion 41 which is located further to the inside (in the Y-axis positive direction) of the inspection object 40 than the site 411 in the Y-axis direction. The regulating member 27 of the present embodiment is disposed so as to overlap a site of the peripheral portion 41 which is located spaced apart from the site 411 to the inside of the inspection object 40. This site is a site 412 of the peripheral portion 41 shown in the enlarged view of FIG. 2. Here, the site 412 is an example of the "second site".

The regulating member 27 is required to be held at a predetermined position with respect to at least the transmitter 26 and the receiver 28. The regulating member 27 of the present embodiment is disposed between the inspection object 40 and the receiver 28 in the arrangement direction of the transmitter 26 and the receiver 28. Further, the regulating member 27 is fixed to the receiver 28. The regulating member 27 may be, for example, spaced apart from the receiver 28 by a predetermined distance and fixed to the receiver 28 via some member. The regulating member 27 of the present embodiment is directly fixed to the receiver 28. The regulating member 27 may be fixed to the receiver 28 in a non-detachable or detachable manner.

The specific shape of the regulating member 27 may be arbitrary. As shown in FIG. 2 and FIG. 3, the regulating member 27 of the present embodiment is formed in a cone shape in which the diameter dimension increases with distance from the inspection object 40 in the arrangement direction of the transmitter 26 and the receiver 28 (that is, in a cylinder with a slope in the curved surface). Alternatively, the regulating member 27 may be formed, for example, in a pyramid shape.

Since the regulating member 27 of the present embodiment is disposed between the inspection object 40 and the receiver 28, the cone-shaped regulating member 27 is disposed so that its diameter dimension increases heading toward the receiver 28 in the arrangement direction of the transmitter 26 and the receiver 28. The cone-shaped regulating member 27 is fixed to the receiver 28 so that the opening end of the regulating member 27 on the receiver 28 side directly contacts the peripheral edge of the receiving surface 280 of the receiver 28.

As shown in FIG. 3, the regulating member 27 of the present embodiment provided as described above faces an annular region S5 including the periphery of the receiving surface 280 of the receiver 28. That is, in the arrangement direction of the transmitter 26 and the receiver 28, the regulating member 27 is arranged in a peripheral region between the transmitting surface 260 and the receiving surface 280, and the regulating member 27 is not arranged in a central region S6 located to the inside of this peripheral region.

The region S6 is a region suitable for receiving focused ultrasonic waves. The linear space from the transmitter 26 to the receiver 28 shown in the region S6 corresponds to the propagation path along which the object waves reach the receiver 28.

That is, by not arranged in the propagation path of the object waves, the regulating member 27 does not regulate (obstacle) the propagation path of the object waves. The regulating member 27 regulates (obstacles) the propagation path of the non-object waves by arranged in the propagation path of the non-object waves.

The region S5 in FIG. 3 corresponds to the regions S2 and S4 in FIG. 2. The region S6 in FIG. 3 corresponds to the region S3 in FIG. 2.

As described above, in the ultrasonic inspection device 20 according to the embodiment, the inspection object 40 is disposed between the transmitter 26 and the receiver 28, which are spaced apart from each other. The ultrasonic inspection device 20, which inspects the inspection object 40 by receiving with the receiver 28 the ultrasonic waves transmitted from the transmitter 26, has the regulating member 27 that regulates the propagation path of non-object waves (second propagation path), which differs from the propagation path of object waves that passes through the inspection object 40 and reaches the receiver 28 by (first propagation path), among the propagation paths of ultrasonic waves from the transmitter 26 to the receiver 28.

Thereby, in the ultrasonic inspection device 20 according to the embodiment, it is possible to delay the time when the non-object waves reach the receiver 28 to be later than the time when the object waves reach the receiver 28, whereby the receiver 28 can receive ultrasonic waves not including the non-object waves. Therefore, it is possible to accurately determine the presence or absence of peeling using the received waves in which the non-object waves are not included, that is, using the object waves.

Further, in the ultrasonic inspection device 20 according to the embodiment, the peripheral portion 41 of the inspection object 40 does not have to be supported in a clamped manner. For this reason, it takes less time to prepare for the inspection of the inspection object 40, and so inspection can be performed efficiently. Further, since it is not necessary to cover the peripheral portion 41, inspection can be easily performed even in the case of a container in which the shape of the peripheral portion of the packaging container is complex.

Here, the operation and advantageous effects of the ultrasonic inspection device 20 shown in FIG. 2 will be further described with reference to FIG. 4.

Figure 4:
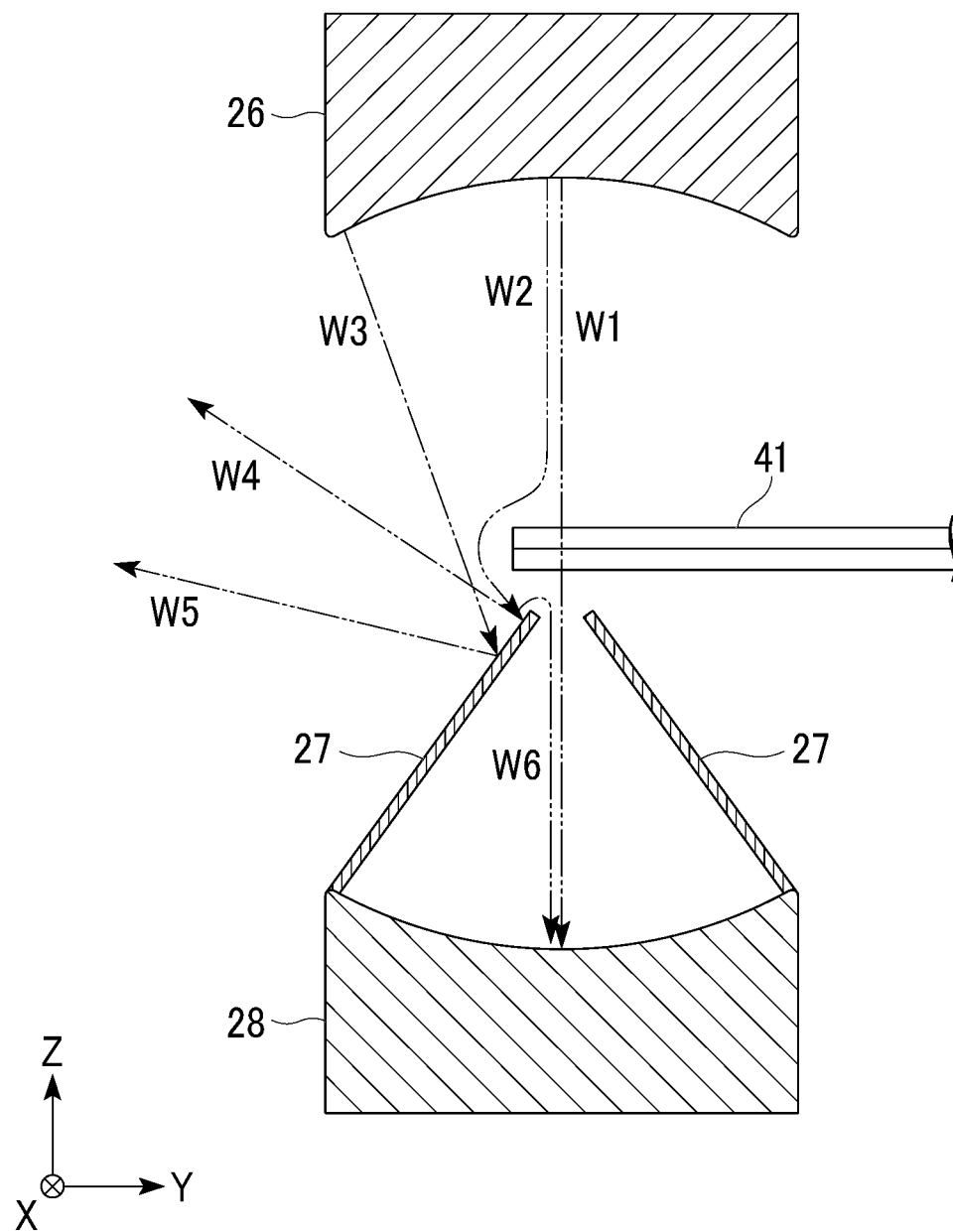
FIG. 4 is a drawing for describing the effect due to the structure of FIG. 2.

As shown in FIG. 4, among the ultrasonic waves transmitted to the inspection object 40 by the transmitter 26, ultrasonic waves W1 reach the receiver 28 by passing through the peripheral portion 41. The ultrasonic waves W1 in this case are object waves. Among the ultrasonic waves transmitted to the inspection object 40, the other ultrasonic waves W2 to W5 do not pass through the inspection object 40. In this example, the ultrasonic waves W2 are diffracted waves (an example of non-object waves) that reach the regulating member 27 by wrapping around the outer side of the end portion 410. Further, the ultrasonic waves W3 are direct waves (an example of non-object waves) that reach the regulating member 27 directly from the outer side of the inspection object 40. The ultrasonic waves W4 and W5 are ultrasonic waves W2 and W3 that have been reflected by the regulating member 27.

The non-object waves such as ultrasonic waves W2 and W3, upon reaching the regulating member 27, are reflected or refracted by the regulating member 27. At this time, part of the non-object waves may reach the receiver 28 by repeated reflection and refraction, but in this case the propagation path to reaching the receiver 28 is longer than the propagation path of the ultrasonic waves W1 (object waves).

For example, the propagation path of the diffracted waves from the ultrasonic waves W2 to W6 is longer than the propagation path of the ultrasonic waves W1. For this reason, when the non-object waves reach the receiver 28, the non-object waves do so later than the object waves.

Thus, the regulating member 27 lengthens the path for the non-object waves to reach the receiver 28, and thereby can delay the time when the non-object waves reach the receiver 28 to be later than the time when the object waves reach the receiver 28.

When the non-object waves reach the receiver 28 later than the object waves, the receiver 28 first receives the object waves. For this reason, among the ultrasonic waves received by the receiver 28, only the object waves are included in the ultrasonic waves in a predetermined time segment after reception is detected, with the non-object waves not being included. If the presence or absence of peeling is determined by analyzing ultrasonic waves in which non-object waves are not included, the accuracy of the determination is improved.

In addition, when the non-object waves have reached the receiver 28 with a delay after the object waves are received by the receiver 28, the receiver 28 receives ultrasonic waves in which the object waves and the non-object waves are mixed. Ultrasonic waves in which object waves and non-object waves are mixed in this case are in a state in which the respective phases of the object waves and the non-object waves are mutually shifted from each other because the non-object waves arrive after the object waves. In this case, it is possible to separate the object waves and the non-object waves by performing phase detection. That is, in the ultrasonic inspection device 20 of the present embodiment, even when the object waves and the non-object waves are received in a mixed state, it is possible to separate the object waves and the non-object waves. Thereby, the presence or absence of peeling can be determined using ultrasonic waves that do not contain non-object waves, and so the accuracy of the determination is improved.

As a comparative example, a case in which the regulating member 27 is not arranged between the transmitter 26 and the receiver 28 will be considered.

In general, ultrasonic waves having a frequency of about 100 kHz to about 3 MHz are often used in accordance with the material of the inspection object 40 in ultrasonic inspection. For example, in the case of peeling inspection of packaging containers, ultrasonic waves of 400 kHz or 800 kHz are used.

Ultrasonic waves tend to converge more easily at higher frequencies (shorter wavelengths). Therefore in the comparative example, especially, in the following two cases, it is confirmed that non-object waves (diffracted waves) are generated that reach the receiver 28 by wrapping around the end portion 410. The first case is the case in which ultrasonic waves have a frequency of 400 kHz and are transmitted to a location 15 mm to the inside of the inspection object 40 from the end portion 410 viewed in the width direction of the peripheral portion 41. The second case is the case in which ultrasonic waves have a frequency of 800 kHz and are transmitted to a location about 5 mm to the inside of the inspection object 40 from the end portion 410 viewed in the width direction of the peripheral portion 41.

In the comparative example, it is confirmed that the object waves reach the receiver 28 with an intensity of about −60 dB, and the non-object waves reach the receiver 28 with an intensity of about −40 dB. The reason why the object waves are attenuated to −60 dB is because, among the ultrasonic waves transmitted from the transmitter 26, the ultrasonic waves that are focused and reach the inspection object 40 are attenuated when passing through the inspection object 40. Also, it is considered that a factor behind the signal intensity of the non-object waves being larger than that of the object waves is that the ultrasonic waves which are not focused (for example, the ultrasonic waves W3 in FIG. 4) reach the receiver 28 without passing through the inspection object 40, that is, without being attenuated.

As described above, in the comparative example, when ultrasonic waves are transmitted to a location near the end portion 410, the non-object waves end up reaching the receiver 28 in a state in which the signal strength is larger than that of the object waves. For this reason, the receiver 28 receives ultrasonic waves in a state in which large-intensity non-object waves are included among the small-intensity object waves, and so it is difficult to extract the object waves even if signal processing or the like is used in a later stage. That is, in the comparative example, accurate and appropriate determination cannot be performed.

In contrast, in the ultrasonic inspection device 20 of the present embodiment, the regulating member 27 is arranged between the inspection object 40 and the receiver 28 as viewed from the arrangement direction of the transmitter 26 and the receiver 28. At this time, a portion of the inspection object 40 on the end portion 410 side thereof and the regulating member 27 are arranged so as to overlap when viewed in the arrangement direction. Thereby, the propagation path for non-object waves to reach the receiver 28 is extended. Therefore, it is possible to cause non-object waves to reach the receiver 28 at a later time than the object waves arrive.

For example, the regulating member 27 is disposed such that the width of the site 411 is 1 mm and the distance L is 1 mm in FIG. 2. In such a case, it has been confirmed that the arrival of the non-object waves is delayed by about 2.5 µs from the time when the object waves arrive. That is, when the frequency at which the ultrasonic waves are being transmitted is 400 kHz, the propagation path of the non-object waves is extended by about one wavelength (0.86 mm). If by extending the propagation path of the non-object waves the time when the non-object waves reach the receiver 28 can be delayed by about one wavelength from that of the object waves, it is possible to sufficiently separate the object waves and the non-object waves.

First Modification of Embodiment

Next, a first modification according to the embodiment will be described with reference to FIG. 5.

Figure 5:
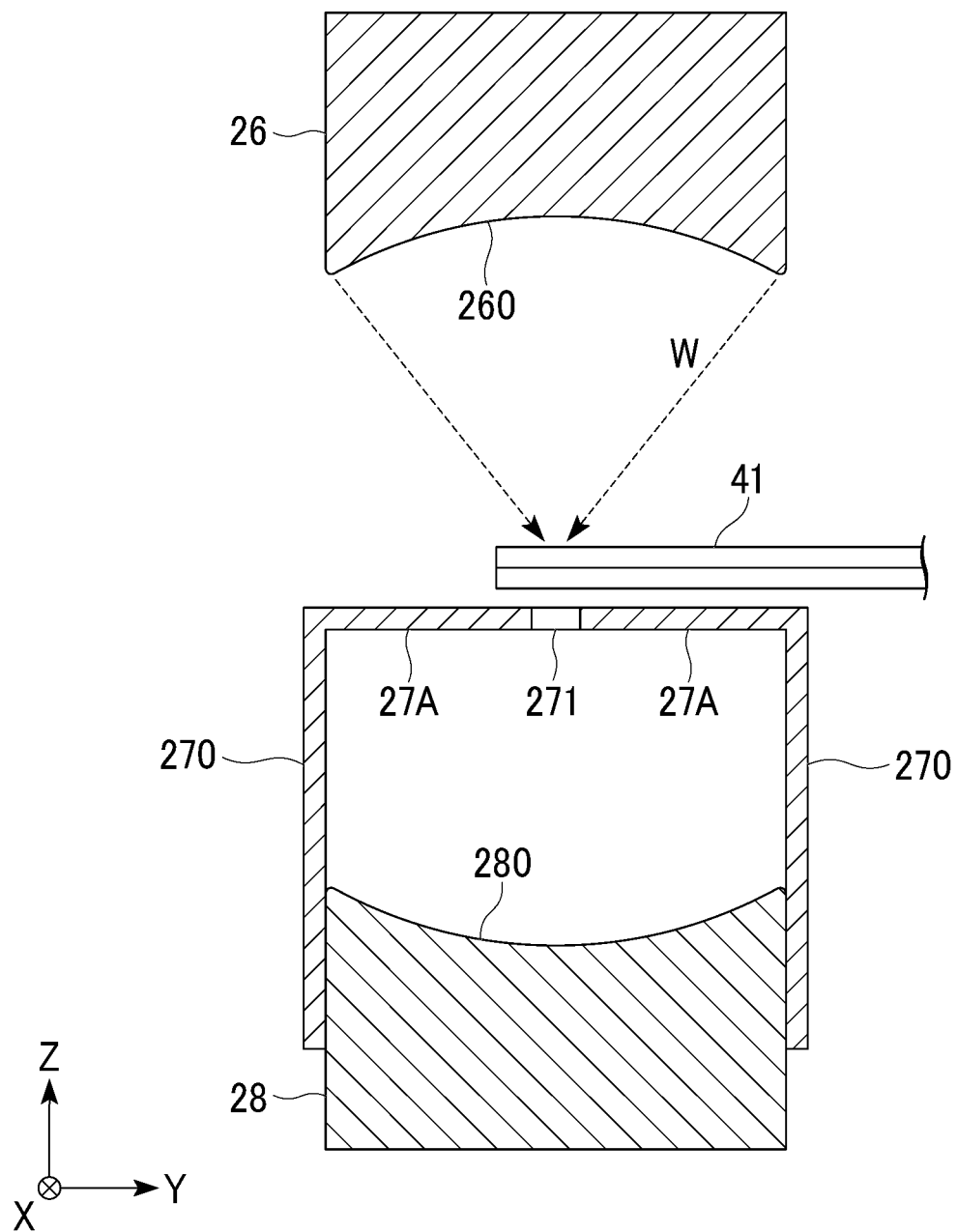
FIG. 5 is a cross-sectional view showing the transmitter 26, the regulating member 27, and the receiver 28 in a first modification of the embodiment.

A regulating member 27A shown in FIG. 5 has a planar shape that is attached to the receiver 28 via leg units 270. The regulating member 27A has a through hole 271 that penetrates in the thickness direction of the regulating member 27A. The through hole 271 may be in a circular shape or a polygonal shape as viewed from the arrangement direction (that is the thickness direction). In FIG. 5, the through hole 271 of the regulating member 27A is formed so as to overlap the central region of the transmitting surface 260 and the receiving surface 280, that is, the region to which the ultrasonic waves are focused, in the arrangement direction of the transmitter 26 and the receiver 28. The regulating member 27A illustrated in FIG. 5 is, similarly to the cone-shaped regulating member 27 illustrated in FIG. 2, disposed so as to face the peripheral region of the transmitting surface 260 and the receiving surface 280 in the arrangement direction of the transmitter 26 and the receiver 28. The ultrasonic inspection device 20 illustrated in FIG. 5 exhibits the same advantageous effects as those of the above embodiment.

Second Modification of Embodiment

Figure 6:
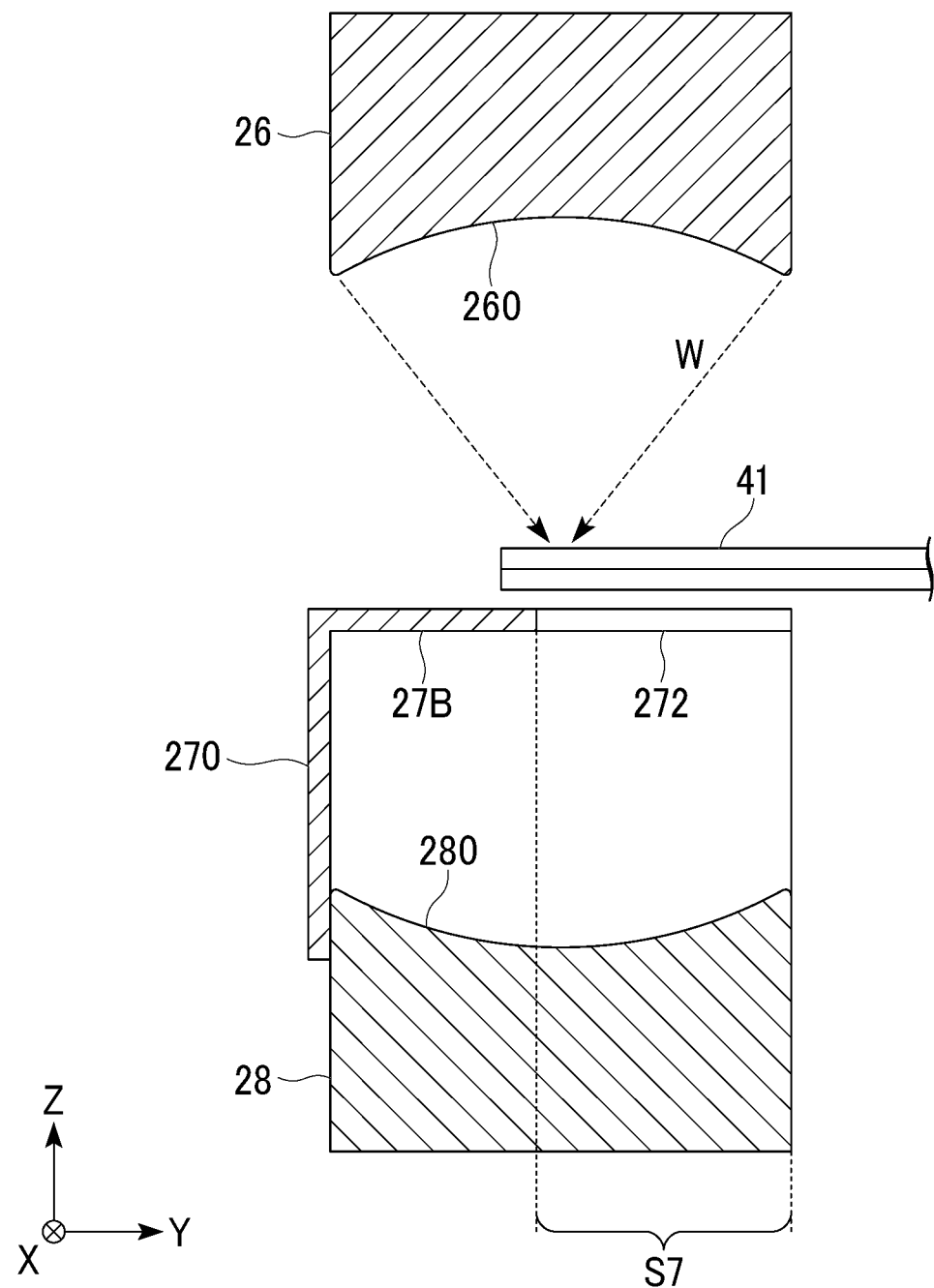
FIG. 6 is a sectional drawing showing the transmitter 26, the regulating member 27, and the receiver 28 in a second modification of the embodiment.
Figure 7:
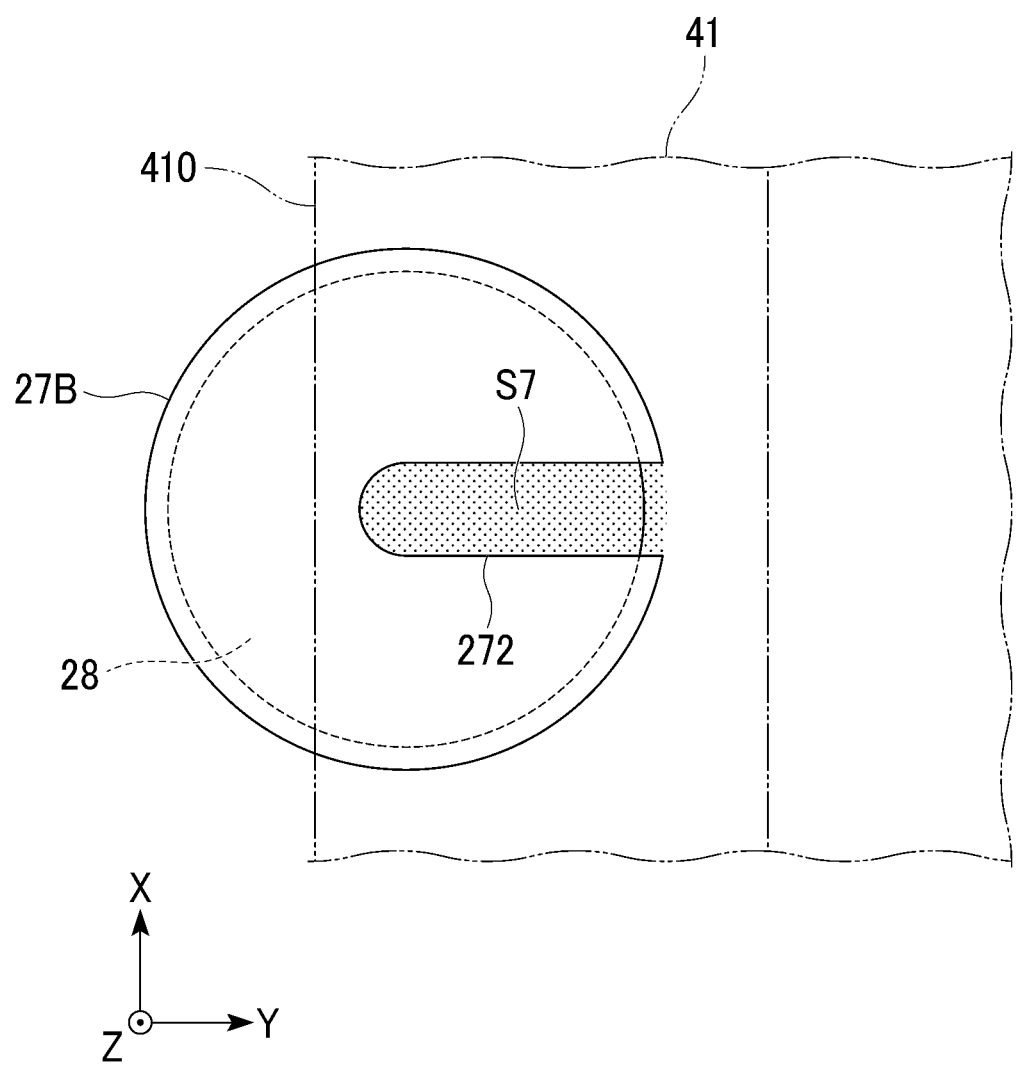
FIG. 7 is a plan view showing the receiver 28 and the regulating member 27 of FIG. 6.

Next, a second modification according to the embodiment will be described with reference to FIG. 6 and FIG. 7. FIG. 6 and FIG. 7 shows a regulating member 27B that has a long hole 272. The long hole 272 penetrates in the thickness direction of the regulating member 27B and extends in a direction orthogonal to the thickness direction. One end of the long hole 272 in the longitudinal direction is open at the end of the regulating member 27. Specifically, the longitudinal direction of the long hole 272 extends in a direction (Y-axis direction) that is orthogonal to the conveying direction (X-axis direction) of the inspection object 40 and the arrangement direction (Z-axis direction) of the transmitter 26 and the receiver 28. More specifically, the long hole 272 starts at a position more to the inside of the inspection object (in the Y-axis positive direction) than the end portion 410 of the inspection object 40, extends in the orthogonal direction, and opens at the end of the regulating member 27B.

In FIGS. 6 and 7, the long hole 272 of the regulating member 27B is formed to overlap with a band-shaped region S7 (band region). The band-shaped region S7 extends from the center to the periphery of the receiving surface 280 in the arrangement direction of the transmitter 26 and the receiver 28. That is, the regulating member 27B is arranged so as to face a region excluding the band-shaped region S7 of the receiving surface 280 in the arrangement direction of the transmitter 26 and the receiver 28. Since the region S7 includes the region where the ultrasonic waves are focused, the regulating member 27B regulates only the non-object waves without blocking the object waves. Accordingly, the ultrasonic inspection device 20 illustrated in FIGS. 6 and 7 exhibits the same advantageous effects as those of the embodiment describe above.

Third Modification of Embodiment

Next, a third modification of the embodiment will be described with reference to FIG. 8.

Figure 8:
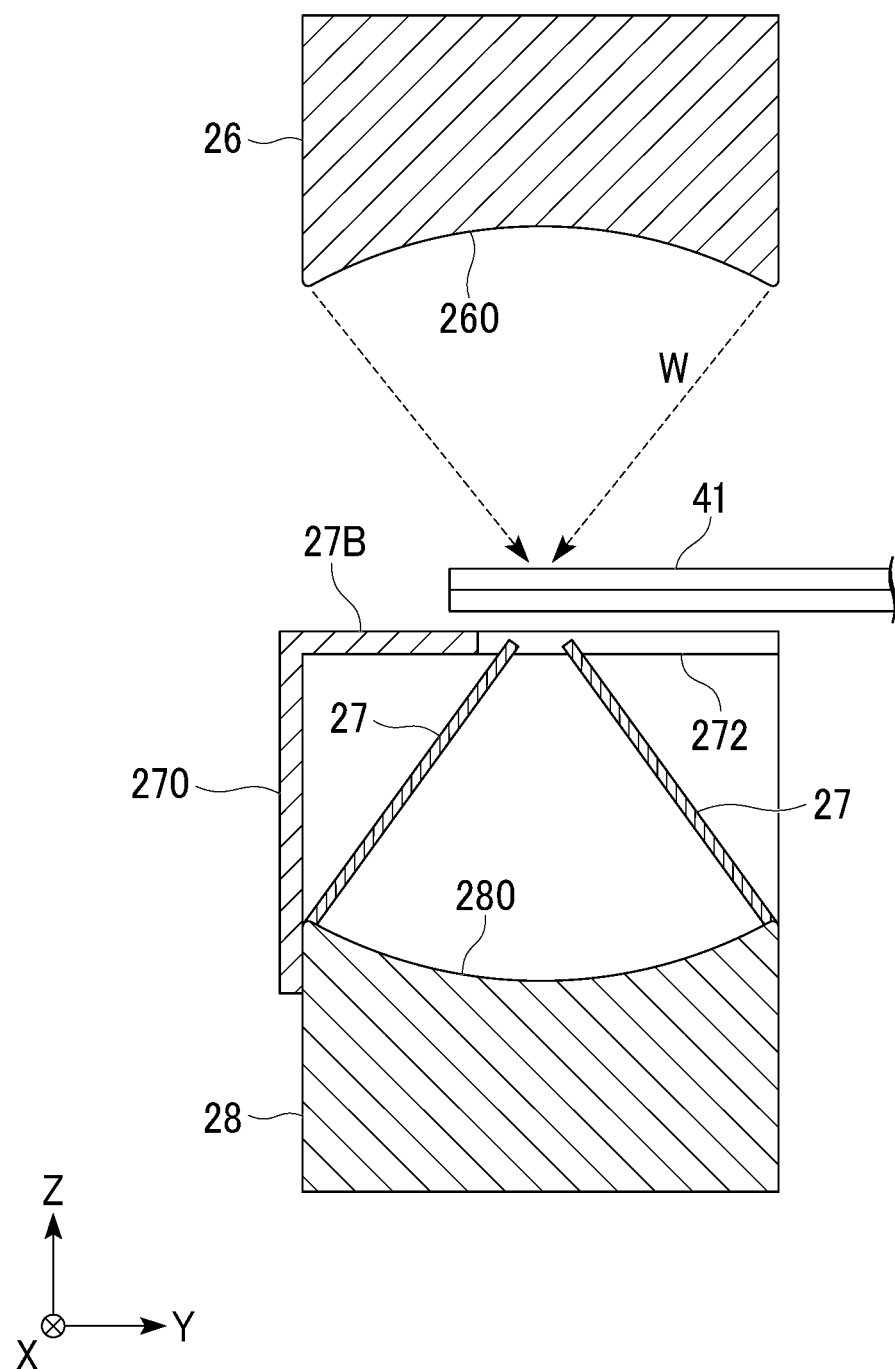
FIG. 8 is a cross-sectional view showing the transmitter 26, the regulating member 27, and the receiver 28 in a third modification of the embodiment.

In some embodiments, the ultrasonic inspection device 20, as exemplified in FIG. 8, may include both a regulating member 27 that is formed in a cone shape (cone-shaped regulating member 27), and a regulating member 27B in which the long hole 272 is formed in a flat plate (flat plate-shaped regulating member 27B). In this case, the distal end of the cone-shaped regulating member 27 having an opening with a small diameter may be inserted into the long hole 272 of the flat plate-shaped regulating member 27B. In place of the flat plate-shaped regulating member 27B, the ultrasonic inspection device 20 may include the flat plate-shaped regulating member 27A shown in FIG. 5 (member in which the through hole 271 is formed in a flat plate). That is, in some embodiments, the ultrasonic inspection device 20 may include both the cone-shaped regulating member 27 and the flat plate-shaped regulating member 27A.

Fourth Modification of Embodiment

Next, a fourth modification of the embodiment will be described with reference to FIG. 9.

Figure 9:
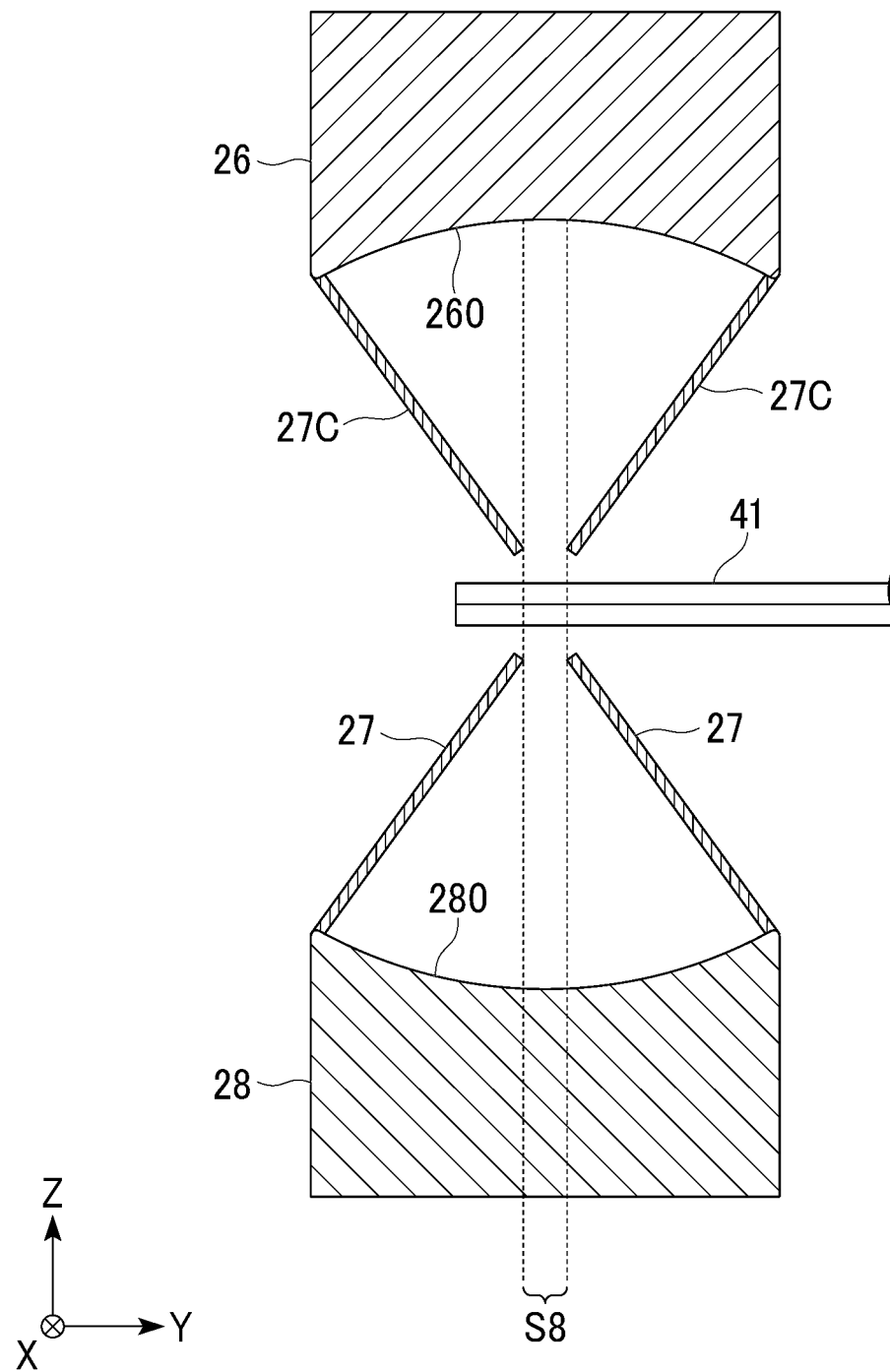
FIG. 9 is a cross-sectional view showing the transmitter 26, the regulating member 27, and the receiver 28 in a fourth modification of the embodiment.

In some embodiments, as shown in FIG. 9, the regulating member 27 (regulating units 27 and 27C) may be provided both between the inspection object 40 and the receiver 28, and between the inspection object 40 and the transmitter 26. That is, the regulating units 27 and 27C may be disposed on both sides of the inspection object 40 in the arrangement direction of the transmitter 26 and the receiver 28. In the configuration illustrated in FIG. 9, the two cone-shaped regulating units 27 and 27C are arranged such that the openings with a small diameter face each other. In addition, these two regulating units 27 and 27C are not arranged between a central region S8 of the transmitting surface 260 and the receiving surface 280 in the arrangement direction of the transmitter 26 and the receiver 28.

The configuration in which the regulating member 27 is disposed both between the inspection object 40 and the receiver 28 and between the inspection object 40 and the transmitter 26 is not limited to the cone-shaped regulating units 27 and 27C. For example, the regulating units 27A and 27B illustrated in FIGS. 5 to 7 may be used.

In the configuration in which the regulating units 27 and 27C are arranged both between the inspection object 40 and the receiver 28 and between the inspection object 40 and the transmitter 26, since it is possible to regulate the arrival of the ultrasonic waves transmitted from the transmitter 26 to the end portion 410 of the inspection object 40, generation of diffracted waves can be suppressed, and arrival of the non-object waves at the receiver 28 can be inhibited.

Fifth Modification of Embodiment

Next, a fifth modification according to the embodiment will be described with reference to FIGS. 10 and 11.

Figure 10:
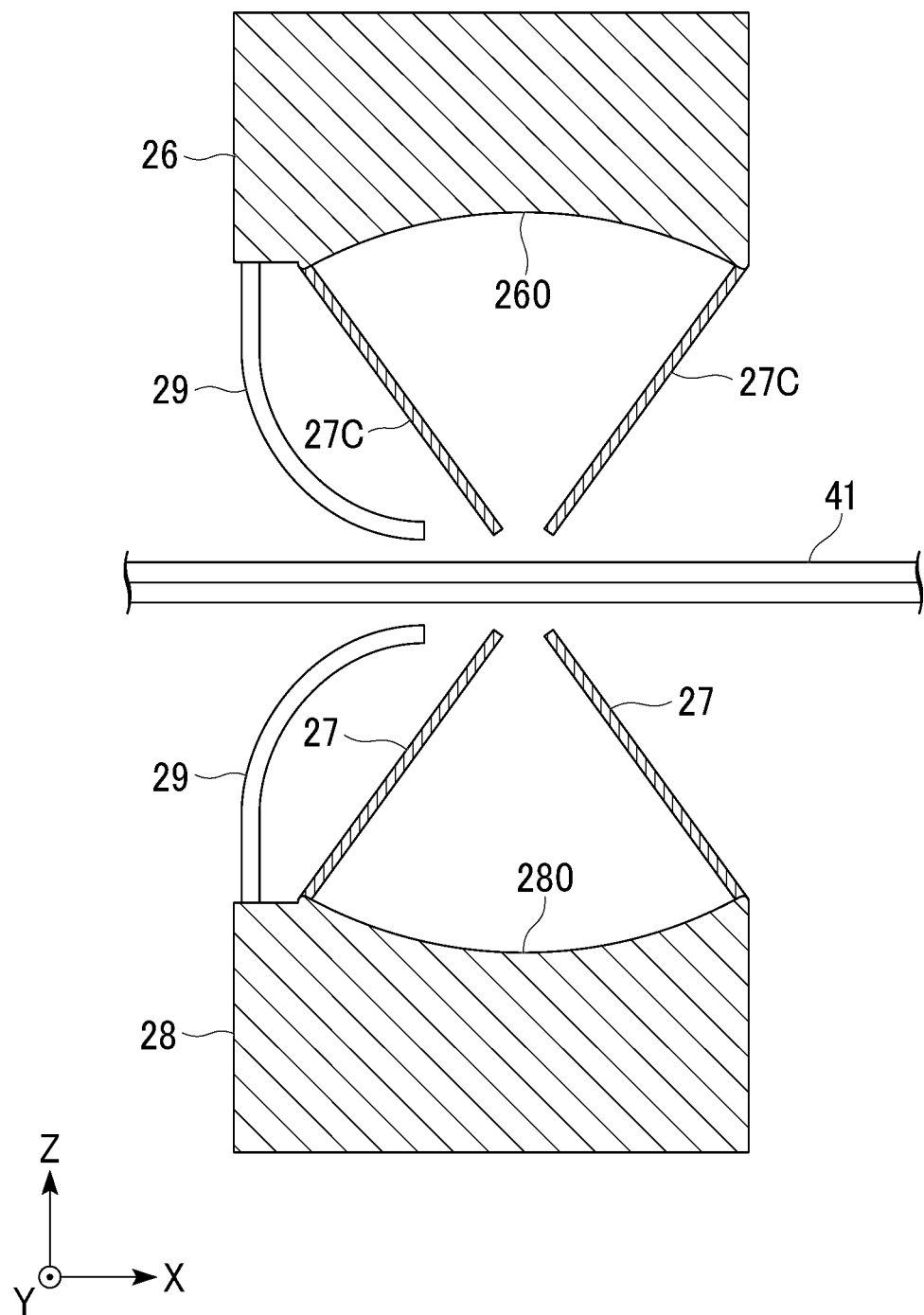
FIG. 10 is a cross-sectional view showing the transmitter 26, the regulating member 27, the receiver 28 and guides 29 in a fifth modification of the embodiment.
Figure 11:
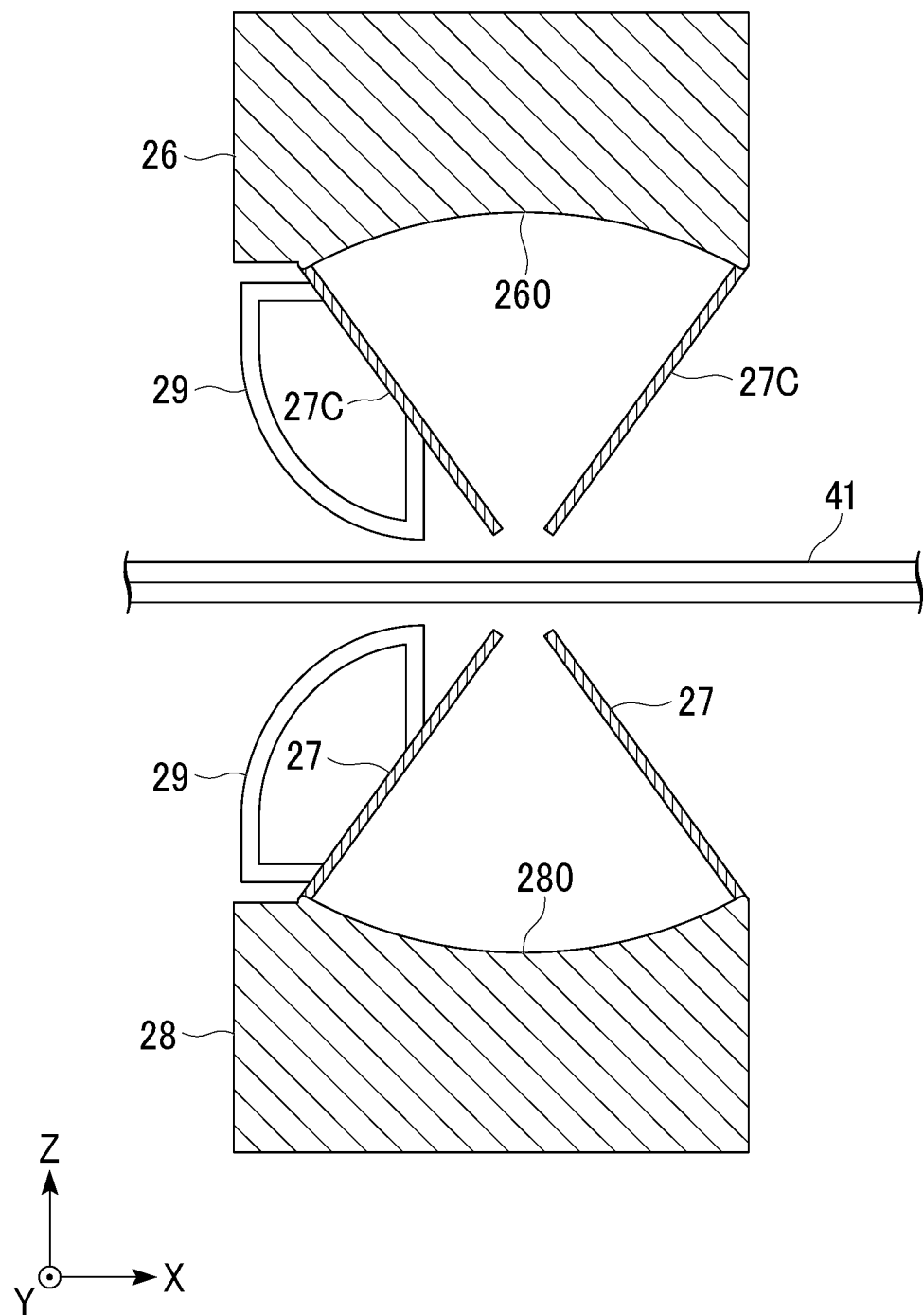
FIG. 11 is a cross-sectional view in which the regulating member 27 and guide 29 are formed integrally in the fifth modification of the embodiment.

In some embodiments, the ultrasonic inspection device 20 may include a pair of guides 29 for guiding the peripheral portion 41 of the inspection object 40 in the arrangement direction of the transmitter 26 and the receiver 28 as shown in FIG. 10.

The guides 29 guide the inspection object 40 so that the site 411 (refer to FIG. 2) including the end portion 410 of the inspection object 40 in the peripheral portion 41 of the inspection object 40 overlaps with regulating member 27 as viewed from the arrangement direction (Z-axis direction) of the transmitter 26 and the receiver 28. That is, the guides 29 position the inspection object 40 with respect to the transmitter 26, the receiver 28, and the regulating member 27 in a direction (XY plane direction) orthogonal to the arrangement direction (Z-axis direction) of at least the transmitter 26 and the receiver 28. The guides 29 may also position the inspection object 40 with respect to the transmitter 26, the receiver 28, and the regulating member 27 in the arrangement direction (Z-axis direction) of the transmitter 26 and the receiver 28.

The pair of guides 29 are disposed on the near side in the conveying direction (X-axis positive direction) of the inspection object 40 with respect to the regulating member 27. That is, the pair of guides 29 are disposed at a position away from the regulating member 27 in the X-axis negative direction. The pair of guides 29 are arranged spaced apart in the arrangement direction of the transmitter 26 and the receiver 28. The pair of guides 29 have guide surfaces that oppose each other in the arrangement direction of the transmitter 26 and the receiver 28. The interval between the guide surfaces of the pair of guides 29 decreases heading in the conveying direction (X-axis positive direction) of the inspection object 40.

In this configuration, when the inspection object 40 is conveyed in the conveying direction (X-axis positive direction), even when the peripheral portion 41 of the inspection object 40 is positioned out of alignment with respect to the regulating member 27 in the arrangement direction, the peripheral portion 41 of the inspection object 40 can be guided (positioned) to an appropriate position by the guide surfaces of the pair of guides 29.

In this configuration, the regulating member 27 may be integrally formed with the guide 29. In some embodiments, the regulating member 27 may also serve as the guide 29 by providing the regulating member 27 with a mechanism such as a guide surface of the guide 29. In this case, for example, as shown in FIG. 11, a part of the regulating member 27 is formed in the same shape as the guide 29 shown in FIG. 10.

Polyethylene Terephthalate (PET) resin may be used as the material of the regulating member 27 in the embodiments described above in view of ease of processing. However, the material is not limited thereto. The regulating member 27 may be made of any material that can regulate the propagation path of non-object waves. The regulating member 27 may be, for example, a thin and flexible material such as paper or film, or a hard material such as wood or metal. In some embodiments, it is sufficient that the regulating member 27 be able to regulate at least the propagation path of non-object waves, and need not completely block non-object waves. Therefore, the material of the regulating member 27 is not limited to a metal or the like having high rigidity. In addition, it is not necessary to bring the regulating member 27 into close contact with the inspection object 40.

In some embodiments, the transmitter 26 may include transmitting elements which are linearly arranged, and the receiver 28 may include receiving elements which are linearly arranged. By employing such configuration, since ultrasonic waves can be transmitted and received over a wider range as compared with the case of a single-point transmitter/receiver, speeding up of the inspection can be achieved.

In the embodiment described above, the regulating member 27 is illustrated as being arranged apart from the inspection object 40 toward the receiver 28 as viewed in the arrangement direction of the transmitter 26 and the receiver 28. However, the arrangement of the regulating member 27 is not limited thereto. The regulating member 27 may be in contact with the inspection object 40.

In the embodiment described above, the case where the conveying direction is the X-axis direction is described as an example. In some embodiments, the conveying direction may be the Y-axis direction, or may be any direction on the XY plane.

In the above-described embodiment, as shown in FIGS. 5 to 7, between the transmitter 26 and the receiver 28, the regulating member 27 (regulating member 27A, 27B) may be disposed, and the regulating member 27 (regulating member 27A, 27B may have a shape of a flat plate whose thickness direction is parallel with the arrangement direction (Z-axis direction) of the transmitter 26 and the receiver 28. Although the regulating member 27 illustrated in FIG. 5 to FIG. 7 is fixed to the receiver 28 via the leg units 270 extending in the arrangement direction from the regulating member 27 to the receiver 28, the regulating member 27 is not limited thereto.

In the embodiment described above, an example is shown in which the regulating member 27 is also provided on the inner side of the inspection object 40 (the site 412 in FIG. 2). However, since the regulating member 27 need only be capable of regulating non-object waves from reaching the receiver 28 from the end portion 410 side, the regulating member 27 on the inner side may be omitted.

In the embodiment described above, the inspection object 40 is guided to a physically appropriate position by the guide plate of the guides 29. However, in some embodiments, a camera may pick up an image from above the inspection object 40 placed on the conveying device 30, the guide 29 may recognize the position of the inspection object 40 from image data of the inspection object 40 obtained from the camera, and the inspection object 40 is guided to an appropriate inspection position by computer control.

Although an example is illustrated in the embodiment described above of the ultrasonic inspection system 1 detecting the presence or absence of peeling in the peripheral portion 41 of the inspection object 40, the ultrasonic inspection system 1 is not limited thereto. The ultrasonic inspection system 1 may be applied to the case of inspecting whether or not various foreign objects or air bubbles are contained in various inspection objects.

According to one embodiment, a transmitter transmits ultrasonic waves to a receiver, and a regulating unit, by regulating a propagation path of the ultrasonic waves that reach the receiver without passing through an inspection object, can delay the time when the ultrasonic waves reach the receiver. For this reason, inspection of an end portion of the inspection object can be performed with high accuracy while saving time and effort.

While preferred embodiments of the invention have been described and illustrated above, it should be noted that these embodiments are exemplary of the invention and are not to be considered as limiting. These embodiments can be implemented in other various forms, and additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An ultrasonic wave inspection device comprising:
a transmitter that has a first surface and outputs ultrasonic waves toward an inspection object;
a receiver that has a second surface facing the first surface and receives the ultrasonic waves output from the transmitter;
a member that is arranged between the transmitter and the receiver and faces a partial region of the first surface and a partial region of the second surface such that the member covers the partial region of the second surface while exposing another region of the second surface disposed outside the partial region of the second surface when viewed from an arrangement direction in which the transmitter and the receiver are arranged, the member being configured to be spaced apart from an end portion of a peripheral portion of the inspection object that overlaps with the member when viewed from the arrangement direction in which the transmitter and the receiver are arranged; and
a guide that guides the inspection object and makes at least the end portion of the peripheral portion of the inspection object overlap with the member when viewed from the arrangement direction in which the transmitter and the receiver are arranged,
wherein the member is integrally formed with the guide.

2. The ultrasonic wave inspection device according to claim 1, wherein the member is away from a predetermined range in which the output ultrasonic waves are focused when viewed from the arrangement direction.

3. The ultrasonic wave inspection device according to claim 1, wherein a range in which the member and the inspection object are overlapped with each other when viewed from the arrangement direction is a range corresponding to a wavelength of the ultrasonic waves output by the transmitter.

4. The ultrasonic wave inspection device according to claim 1, wherein the member has a cone shape, a diameter of the member increasing heading toward the receiver in the arrangement direction.

5. The ultrasonic wave inspection device according to claim 4, wherein the member is spaced apart from the inspection object by a distance corresponding to a wavelength of the ultrasonic waves output by the transmitter, in the arrangement direction.

6. The ultrasonic wave inspection device according to claim 1,
wherein the member has a long hole penetrating in the arrangement direction and extending in a longitudinal direction orthogonal to the arrangement direction, and
the long hole has one end in the longitudinal direction, the one end opening to an end of the member.

7. The ultrasonic wave inspection device according to claim 1, wherein the member is arranged between the inspection object and the receiver in the arrangement direction.

8. The ultrasonic wave inspection device according to claim 7, wherein the member is fixed to the receiver.

9. The ultrasonic wave inspection device according to claim 1, wherein the guide includes a pair of guides configured to be disposed on opposite sides of the inspection object from each other when the at least the end portion of the peripheral portion of the inspection object overlaps with the member.

10. The ultrasonic wave inspection device according to claim 1,
wherein the guide includes a pair of guides arranged spaced apart from each other in the arrangement direction in which the transmitter and the receiver are arranged, and
the pair of guides have respective guide surfaces that oppose each other in the arrangement direction in which the transmitter and the receiver are arranged.

11. The ultrasonic wave inspection device according to claim 10, wherein a distance between the respective guide surfaces of the pair guides decreases heading in a conveying direction of the inspection object.

12. An ultrasonic wave inspection device comprising:
a transmitter that has a first surface and outputs ultrasonic waves toward an inspection object;
a receiver that has a second surface facing the first surface and receives the ultrasonic waves output from the transmitter;
a member that is arranged between the transmitter and the receiver and faces a partial region of the first surface and a partial region of the second surface; and
a guide that guides the inspection object and makes at least an end portion of a peripheral portion of the inspection object overlap with the member when viewed from an arrangement direction in which the transmitter and the receiver are arranged,
wherein the guide includes a first guide connected to the member,
wherein the first guide includes a first portion, a second portion, and a third portion that connects the first portion to the second portion and is spaced apart from the member, and
wherein the first guide is connected to the member by the first portion and by the second portion.

13. The ultrasonic wave inspection device according to claim 12, wherein the guide further includes a second guide configured to be disposed on an opposite side of the inspection object from the first guide when the at least the end portion of the peripheral portion of the inspection object overlaps with the member.

14. The ultrasonic wave inspection device according to claim 12,
wherein the guide includes a second guide arranged spaced apart from the first guide in the arrangement direction in which the transmitter and the receiver are arranged, and
the first guide and the second guide have respective guide surfaces that oppose each other in the arrangement direction in which the transmitter and the receiver are arranged.

15. The ultrasonic wave inspection device according to claim 14, wherein a distance between the respective guide surfaces of the first guide and the second guide decreases heading in a conveying direction of the inspection object.

* * * * *